C. J. MENGES.
ROUNDABOUT.
APPLICATION FILED AUG. 6, 1909.

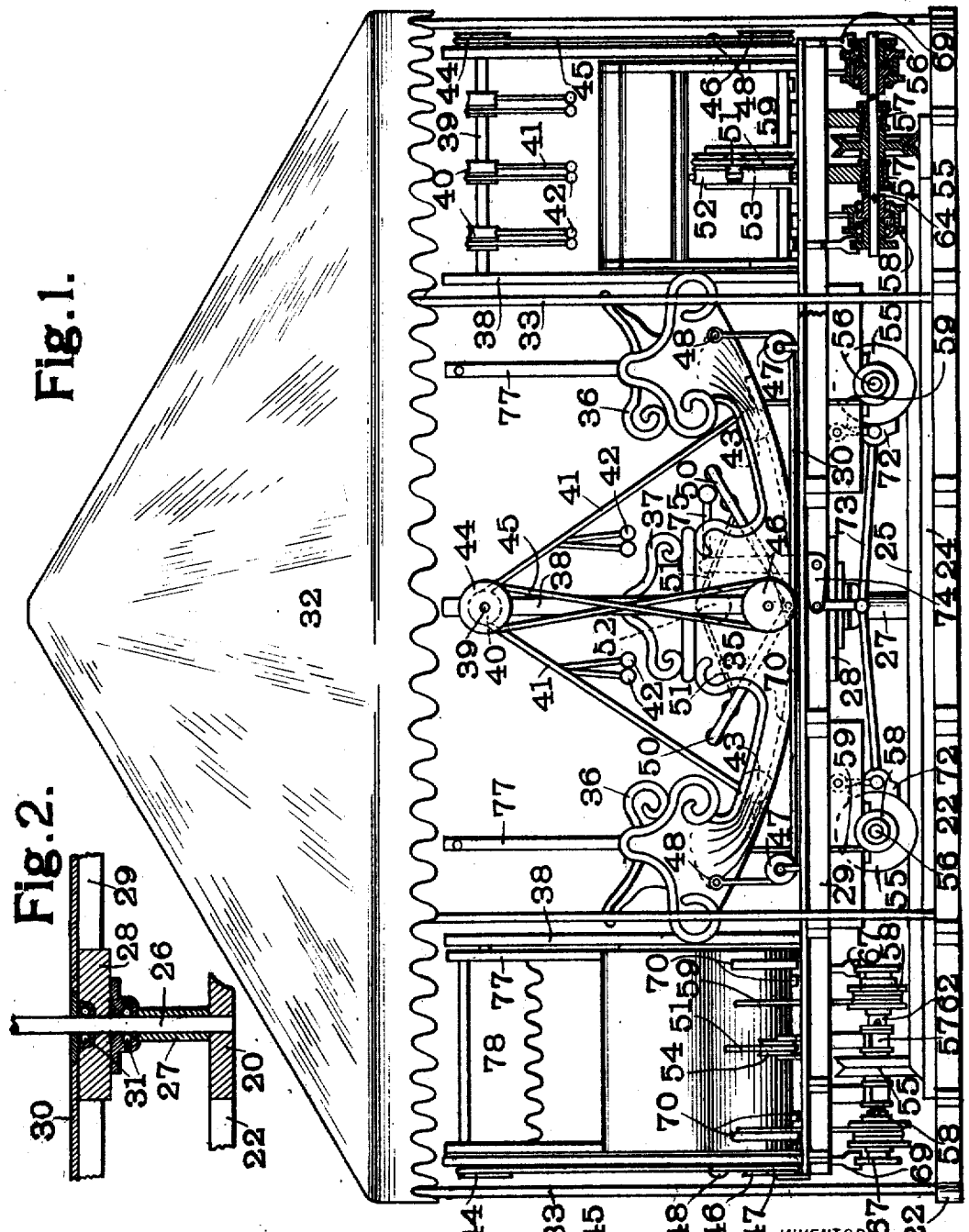

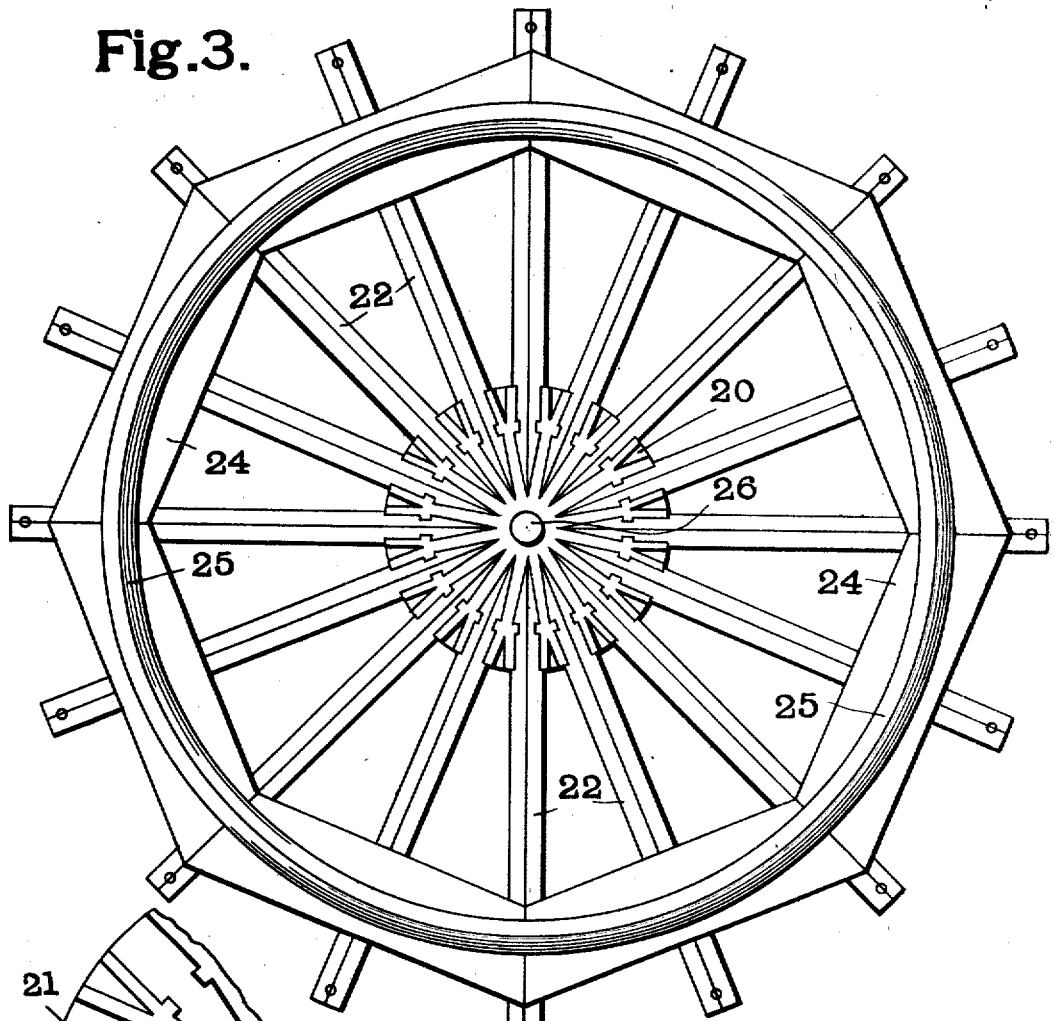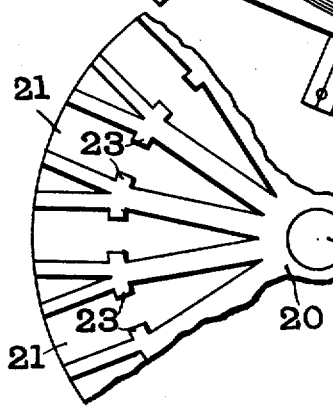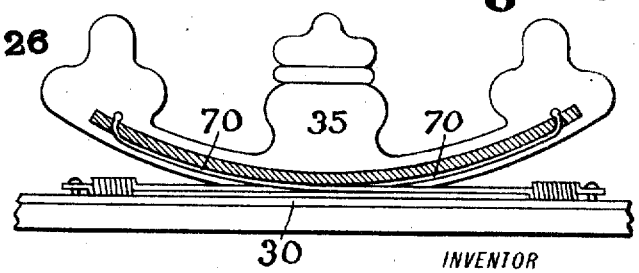

1,011,984.

Patented Dec. 19, 1911.
6 SHEETS—SHEET 3.

WITNESSES:
L. L. Mead.
W. A. Alexander.

INVENTOR
Charles J. Menges
BY
Fowler & Huffman
ATTORNEY

C. J. MENGES.
ROUNDABOUT.
APPLICATION FILED AUG. 6, 1909.

1,011,984.

Patented Dec. 19, 1911.
6 SHEETS—SHEET 4.

WITNESSES:
L. L. Mead
W. A. Alexander

INVENTOR
Charles J. Menges
BY Fowler & Huffman
ATTORNEY

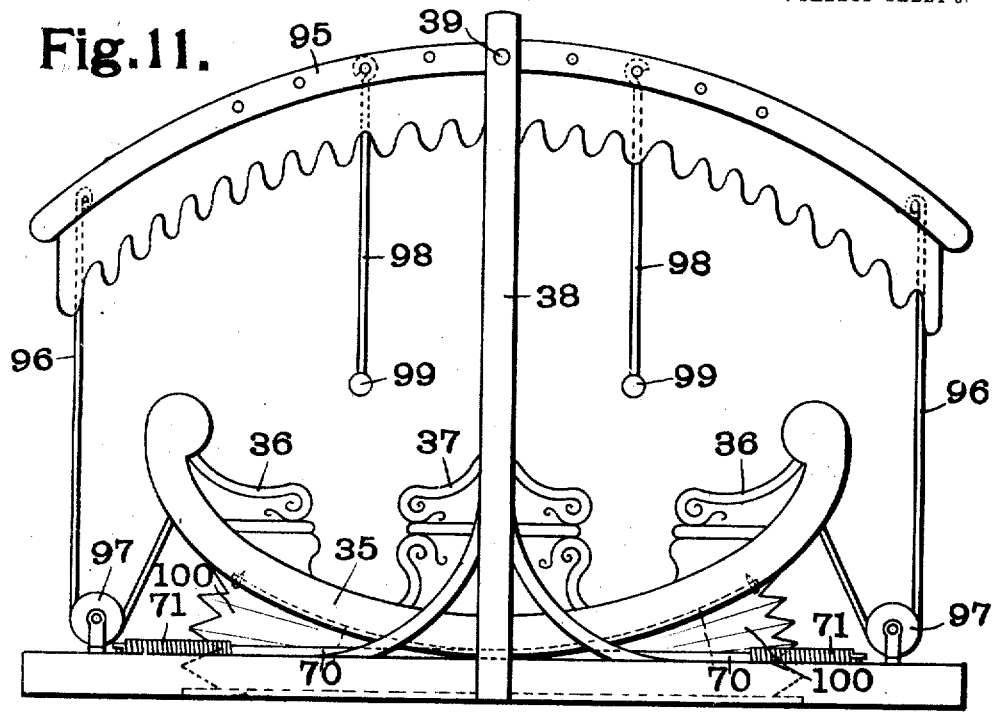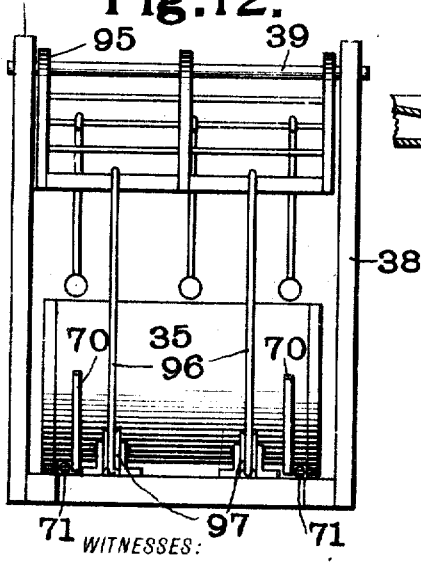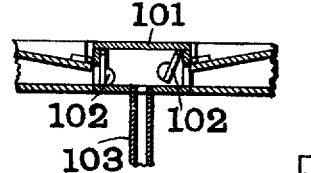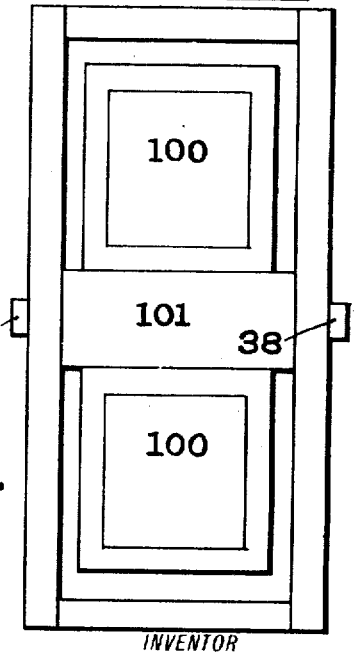

C. J. MENGES.
ROUNDABOUT.
APPLICATION FILED AUG. 6, 1909.

1,011,984.

Patented Dec. 19, 1911.
6 SHEETS—SHEET 6.

WITNESSES:
L. L. Mead.
W. A. Alexander.

INVENTOR
Charles J. Menges.
BY
Fowler & Huffman
ATTORNEY

UNITED STATES PATENT OFFICE.

CHARLES J. MENGES, OF ST. LOUIS, MISSOURI.

ROUNDABOUT.

1,011,984. Specification of Letters Patent. Patented Dec. 19, 1911.

Application filed August 6, 1909. Serial No. 511,503.

*To all whom it may concern:*

Be it known that I, CHARLES J. MENGES, a citizen of the United States, residing at the city of St. Louis, in the State of Missouri, have invented a certain new and useful Roundabout, of which the following is such a full, clear, and exact description as will enable any one skilled in the art to which it appertains to make and use the same, reference being had to the accompanying drawings, forming part of this specification.

My invention relates especially to a roundabout but many of the features of my invention may be used for other forms of amusement devices.

The object of my invention is to provide a roundabout with rocking devices, the rocking member having seats and to provide means whereby the rocking member may be operated either by hand or foot power and further to utilize the power imparted to the rocking member for rotating the roundabout or for revolving any suitable mechanism.

Figure 9:
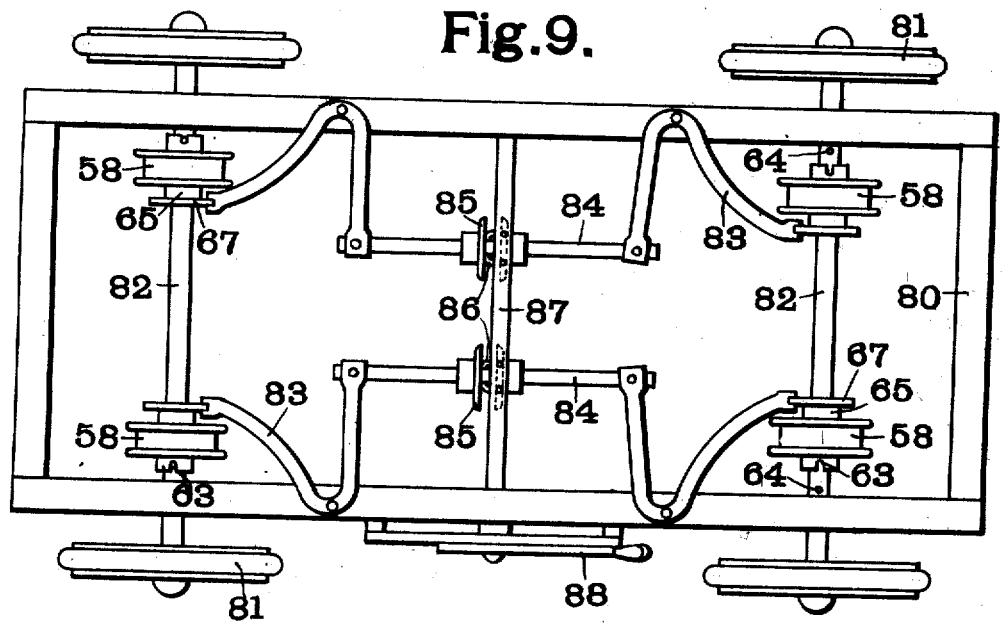
Figure 10:
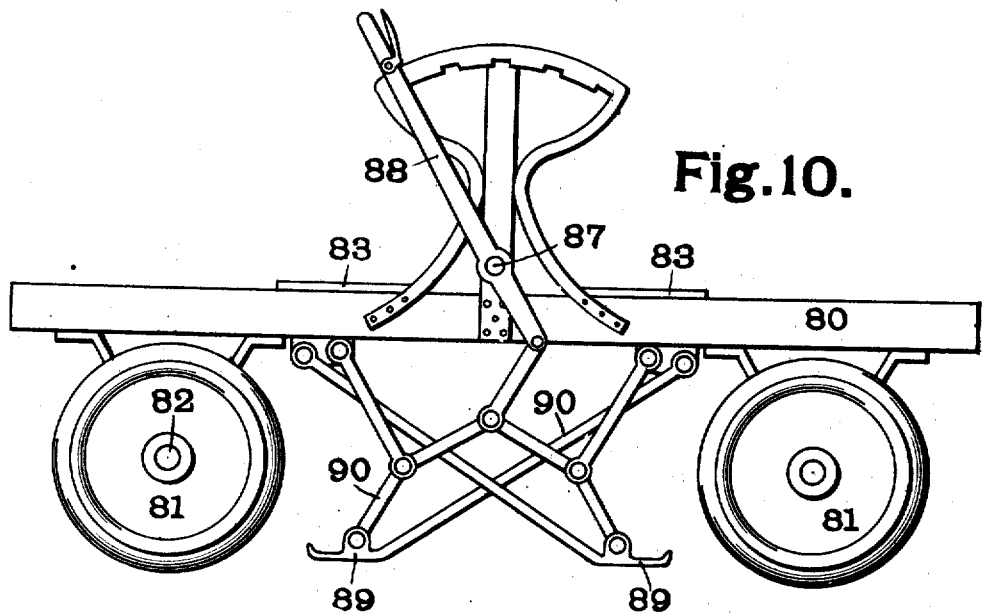
Figure 15:
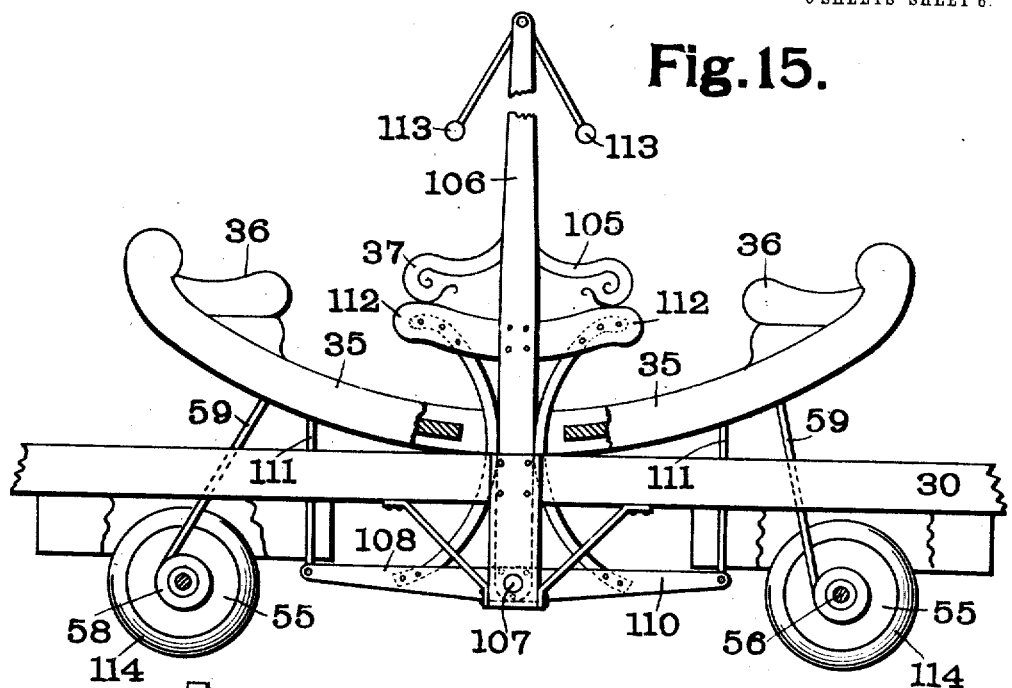
Figure 16:
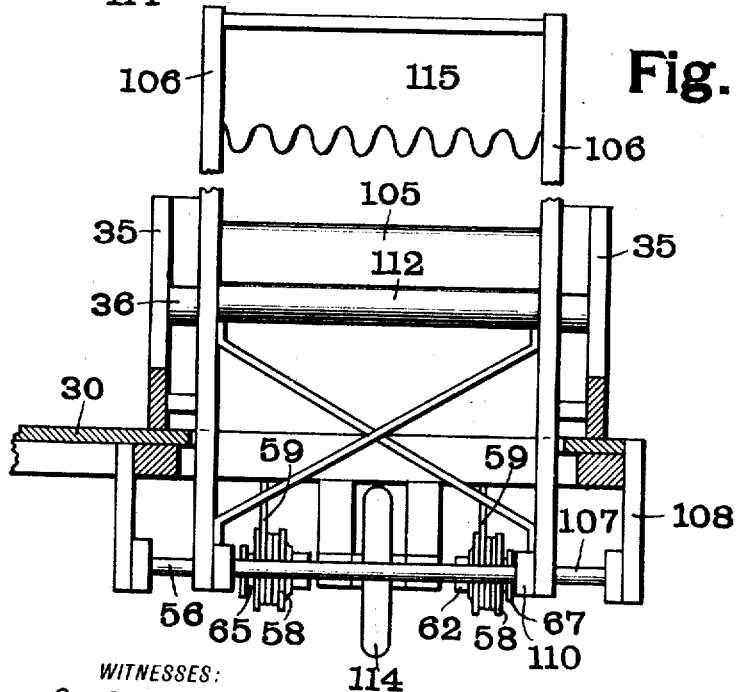

In the accompanying drawings which illustrate some forms of roundabouts made in accordance with my invention, Figure 1 is an elevation of the preferred form of my device. Fig. 2 is a sectional view showing a detail of construction, Fig. 3 is a top plan view of the lower platform, Fig. 4 is a detailed view of the portion of the spider shown in Fig. 3. Figs. 5, 6, 7 and 8 are enlarged detailed views of the power transmitting mechanisms. Fig. 9 is a plan view showing a modification. Fig. 10 is a side elevation of the parts shown in Fig. 9. Fig. 11 is a side elevation of another modification. Fig. 12 is another view of the modification shown in Fig. 11. Fig. 13 is a sectional view showing a detail of construction. Fig. 14 is a top plan view of the bellows mechanism shown in Fig. 11. Fig. 15 is a side elevation showing a still further modification. Fig. 16 is an end view of the modification shown in Fig. 15, and Fig. 17 is a sectional view showing the method of securing the rocking members against lateral movement.

Like marks of reference refer to similar parts in the several views of the drawings.

20 is a spider forming the center of the lower platform. This spider 20 is provided with grooves 21 as best shown in Fig. 4, said grooves being adapted to receive radial arms 22. These arms are held against longitudinal movement by means of lugs 23 formed on spider 20 and engaging with the corresponding notches in arms 22. The arms 22 carry an approximately circular platform 24 upon which is mounted a circular track 25. In the center of the spider 20 is an upright 26 as best shown in Fig. 2. Surrounding the upright 26 is a sleeve 27 over which is a spider 28 similar to the spider 20 and carrying arms 29 which form the upper platform. The upper platform is provided with flooring 30. Ball bearings 31 are provided to allow the upper platform to freely rotate. Carried by the upright 26 and uprights 33 on the outer edge of the lower platform is a cover 32.

Arranged on the flooring 30 are a number of rocking members 35 best shown in Fig. 1. Each of these rocking members 35 is provided with a pair of end seats 36 and a central seat 37. In order to actuate the rocking devices 35 I provide the said rocking device with a pair of uprights 38 carrying a shaft 39 upon which are arranged pulleys 40. Around these pulleys 40 I wind the upper ends of ropes 41 provided with handles 42 in a position where they may be reached by the occupants of seats 36 and 37. The ropes 41 are extended to the bottom of the rocking device 35 and their lower ends wound around spring drums 43 which hold the ropes 41 taut. On the end of the shaft 39 is a pulley 44 around which passes a rope 45. This rope 45 is extended around a pulley 46 from which each end passes to a pulley 47 and is then attached at 48 to the end of the rocking device 35. It will be evident therefore, that when one of the ropes 41 is drawn down by handles 42 the rope 45 will pull down one end of the rocking device 35 and thus actuate it. In order to actuate the rocking device 35 by foot power I provide a pair of pedals 50 to which are attached ropes 51. These ropes 51 pass around pulleys 52 and 53, thence around pulleys 54 to the rocking device 35 in the same manner as the ropes 45. It will thus be seen that by operating the pedals 50 the rocking device will be actuated in the same manner as by operating the handles 42. In order to rotate the platform from the rocking movement of the members 35 I provide the said platform with a number of wheels 55 adapted to travel on the track 25. Each of the wheels 55 is mounted on the shaft 56 carried in bearings 57. Mounted on each end of the shaft 56 is a power transmitting device such as shown in Figs. 5, 6, 7 and 8. This power transmitting device consists of a drum 58 on the periphery of which is wound a rope 59 which extends up to the rocking member 35 as best shown in Fig. 1. Within the drum 58 is a ratchet wheel 60 which is loosely mounted on the shaft 56 and is engaged by pawls 61 carried by the drum 58. Each of the ratchet wheels 60 is provided with a hub 62 projecting through the drum 58. This hub 62 is provided with slots 63 adapted to engage with pins 64 on the shaft 56 so that by moving the drum longitudinally of the shaft it can be thrown into and out of engagement with the same. A cylindrical member 65 projects into the drum 58 at the opposite end from the hub 62 and to this member is attached one end of a spring 66, the opposite end of which is attached to the drum. The member 65 is provided with a disk 67 which is attached by means of a pin 68 to a forked lever 69. Thus by moving the lever 69 the drum can be moved into and out of engagement with the shaft 56 and at the same time the lever 69 prevents the member 65 from rotating so that the spring 66 will actuate to wind up the slack of the rope 59 when the end of the rocking member 35 to which it is attached descends. When the said end ascends, however, the pawl 61 will operate the wheel 60 and will cause the shaft 56 to be rotated in case the drum is moved into such position that the pins 64 engage the slots 63. In this way it will be evident that the platform 30 will be rotated when the member 35 is rocked. In case it is desired to change the direction of rotation the drum 58 at one side of the wheel 55 is thrown out of engagement with the shaft and drum at the other side is thrown into engagement, the two drums being arranged to rotate in opposite directions. In order to prevent the members 35 from having any but a rotary motion I provide wires or flat metal ribbons 70, one end of each of said wires or ribbons being attached to the bottom of the rocking member and the other end to the floor 30. The ribbons are arranged in pairs and cross so as to hold the member 35 effectively against any but the proper motion. The ribbons 70 may be provided with coil springs 71 as shown in Fig. 11 so as to take up any slack in the ribbons. Two pairs of ribbons are preferably provided, one at each side of the rocking device as best shown at the left hand side of Fig. 1.

In operating the form of my device shown in Fig. 1, the operator seated in one of the seats 36 grasps the handle 42 and thus throws a portion of his weight upon the rope 41. This causes the rotation of the shaft 39 carrying the pulley 40 around which the rope 41 is wound. The slack of the rope will be taken up by the spring drum 43 at the same time the necessary amount of rope is supplied by the spring drum 43 at the opposite side so as to allow the ropes 41 on the opposite side of the rocking member to be wound upon the second set of pulleys 40. The rotation of the shaft 39 rotates the pulley 44 carried on the end of said shaft and so draws upon one of the ropes 45 as to draw downwardly on the end of the rocking member opposite to that on which the operator is seated. A portion of the operator's weight is thus not only removed from the seat on which he is situated but is transferred to the opposite end of the rocking member. The movement of the rocking member is transferred to the driving mechanism through the rope 59 as has been heretofore described.

In order to bring the platform 30 to rest after it is in motion I provide a pair of brake shoes 72 adapted to bear on the wheels 55 and connected by toggle arms 73. These toggle arms 73 are actuated by a bell crank lever 74 having a handle 75 arranged adjacent to one of the seats 36. The end seats 36 are also preferably provided with uprights 77 carrying strips of paper or cloth which act as fans for the occupants of the seats 36.

In Figs. 9 and 10 I have shown a modification in which the movement of the rocking member may be utilized to propel a platform 80 in a path other than circular. In this modification platform 80 is provided with four wheels 81 mounted on shafts 82. These shafts 82 carry the drums 58 which are actuated from the rocking member as hereinbefore described. The disks 67 of the drum 58 are engaged by bell crank levers 83 which are connected in pairs by bars 84. These bars 84 are provided with flanges 85 engaging arms 86 extending downwardly from a shaft 87. This shaft 87 is operated by a hand lever 88 so as to throw one pair of drums into engagement with one of the shafts 82 and the other drums out of engagement therewith or to throw all four drums out of engagement with the shafts. This latter is accomplished when the lever 88 is in the central position. The lever 88 also operates a pair of brake shoes 89 adapted to operate on the shafts on which the wheels 81 run. The brake shoes 89 are actuated by a series of toggle levers 90 pivoted to the lower end of the operating lever 88.

In Figs. 11, 12, 13 and 14 I have shown a slight modification in the manner of operating the power transmitting devices for the rocking member 35. In this modification the uprights 38 have pivoted to them at 39 curved levers 95 which are connected by means of ropes 96 fastened over pulleys 97 to the ends of the rocking member 35. The levers 95 are actuated by means of ropes 98 provided with handles 99 arranged adjacent to the seats 36 and 37. It will be evident that by operating the handles 99 the rocking member 35 will be actuated. Beneath the rocking member 35 I place a pair of bellows 100 opening into an air box 101 provided with valves 102 and an air outlet 103 so that when the member 35 is actuated air will be forced through the pipe 103 and this air may be utilized to operate an organ or other musical instrument on the round-about.

In Figs. 15 and 16 I have shown still further modification. In this modification the rocking member 35 is not provided with the central seat 37. In lieu of this seat an independently movable seat 105 is provided. This seat 105 is carried by uprights 106 passing through an opening in the bottom of the rocking member 35 and pivoted by means of a shaft 107 to downwardly projecting arms carried by the platform 30. The shaft 107 has rigidly secured to it an arm 110 connected by ropes 111 to the rocking member 35 so that when the central seat 105 is moved relative to the seats 36 the rocking device will be actuated. This actuation is secured by the difference in leverage, between seats 105 and 36. Movement between seats 105 and 36 may be secured by placing the feet against the edges 112 of the seat 105 or by drawing on the handles 113 carried on the uprights 106. The wheels 55 in these views are shown provided with rubber tires 114 so that they may operate on a smooth platform and thus dispense with the track 55. The uprights 106 may also be provided with strips 115 of paper cloth to act as fans.

Figure 5:
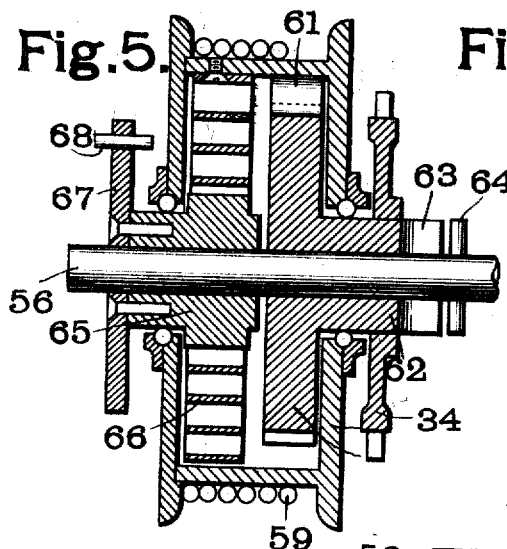
Figure 6:
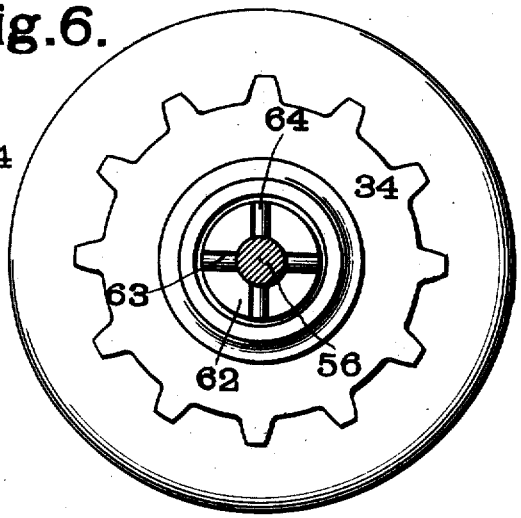
Figure 7:
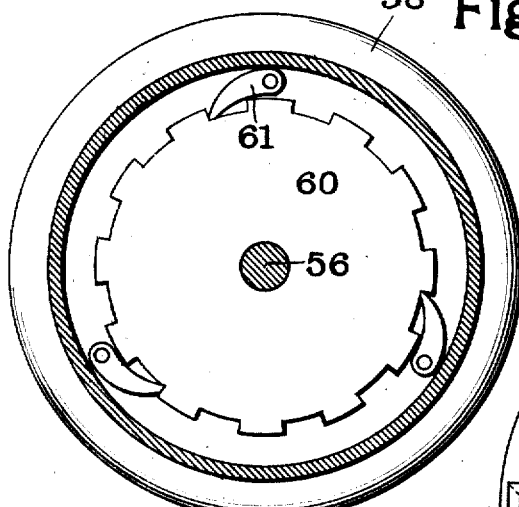
Figure 8:
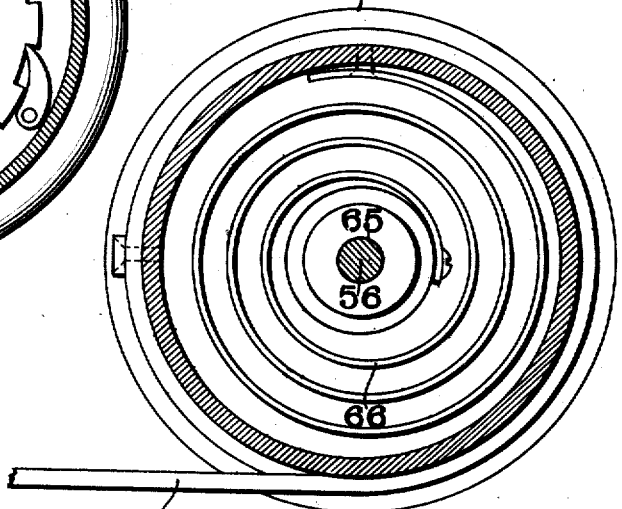

The hub 62 of the drum 58 is preferably provided with sprocket wheel 34 as shown in Fig. 5 so that when the drum is thrown out of engagement with the shaft 56 the sprocket wheel may be used to transmit power to any suitable device.

Having fully described my invention what I claim as new and desire to secure by Letters Patent of the United States is:

1. In an amusement device, the combination with a platform, of wheels for said platform, ratchet mechanism for operating said wheels, a brake, and means for actuating said brake and reversing the direction of rotation of said wheels.

2. In an amusement device, the combination with a platform, of wheels for said platform, ratchet mechanism for operating said wheels, a brake adapted to bear on the wheel supporting surface, and means for actuating said brake and reversing the direction of rotation of said wheels.

3. In an amusement device, the combination with a platform, of wheels for said platform, a ratchet device for operating said wheels in one direction, a second ratchet device for operating said wheels in the opposite direction, a brake, and means for throwing said ratchet device into and out of operation, said means also operating said brake.

In testimony whereof I have hereunto set my hand and affixed my seal in the presence of the two subscribing witnesses.

CHARLES J. MENGES. [L. S.]

Witnesses:
W. A. ALEXANDER,
ELIZABETH BAILEY.